(12) United States Patent
Kashi et al.

(10) Patent No.: US 12,051,294 B2
(45) Date of Patent: *Jul. 30, 2024

(54) SMART LOCKER AGNOSTIC OPERATING PLATFORM ENABLED RETRIEVAL OF ITEMS

(71) Applicant: SMIOTA, INC., Pleasanton, CA (US)

(72) Inventors: Manjunatha Kashi, Milpitas, CA (US); Kailasnath Dornadula, Fremont, CA (US); Albert Calpito, Pleasanton, CA (US); Khurram Mahmood, San Ramon, CA (US)

( * ) Notice: Subject to any disclaimer, the term of this patent is extended or adjusted under 35 U.S.C. 154(b) by 500 days.

This patent is subject to a terminal disclaimer.

(21) Appl. No.: 16/950,837

(22) Filed: Nov. 17, 2020

(65) Prior Publication Data

US 2021/0074100 A1 Mar. 11, 2021

Related U.S. Application Data

(63) Continuation-in-part of application No. 17/086,391, filed on Oct. 31, 2020, now abandoned, and a continuation-in-part of application No. 16/013,930, filed on Jun. 20, 2018, now Pat. No. 10,872,306.

(51) Int. Cl.
*G07C 9/00* (2020.01)
*H04L 9/40* (2022.01)
*H04W 4/80* (2018.01)

(52) U.S. Cl.
CPC ..... *G07C 9/00912* (2013.01); *G07C 9/00309* (2013.01); *G07C 9/00571* (2013.01); *H04L 63/08* (2013.01); *H04W 4/80* (2018.02)

(58) Field of Classification Search
CPC . H04L 63/08; G07C 9/00912; G07C 9/00571; G07C 9/00309; H04W 4/80
USPC .......................................................... 726/2
See application file for complete search history.

(56) References Cited

U.S. PATENT DOCUMENTS

| 2016/0027261 A1* | 1/2016 | Motoyama | ............ G06Q 10/04 340/313 |
| 2017/0147975 A1* | 5/2017 | Natarajan | ............ A47G 29/141 |

* cited by examiner

*Primary Examiner* — Benjamin A Kaplan

(57) ABSTRACT

The subject disclosure relates to the automated detection of user devices by smart locker devices. In an aspect, a system is described comprising a detection component that detects, by an application executing on a user device, signal data corresponding to a smart locker device. Furthermore a virtualization layer can be employed to allow for the management of detection events corresponding to several user devices by several differentiated smart locker devices.

15 Claims, 9 Drawing Sheets

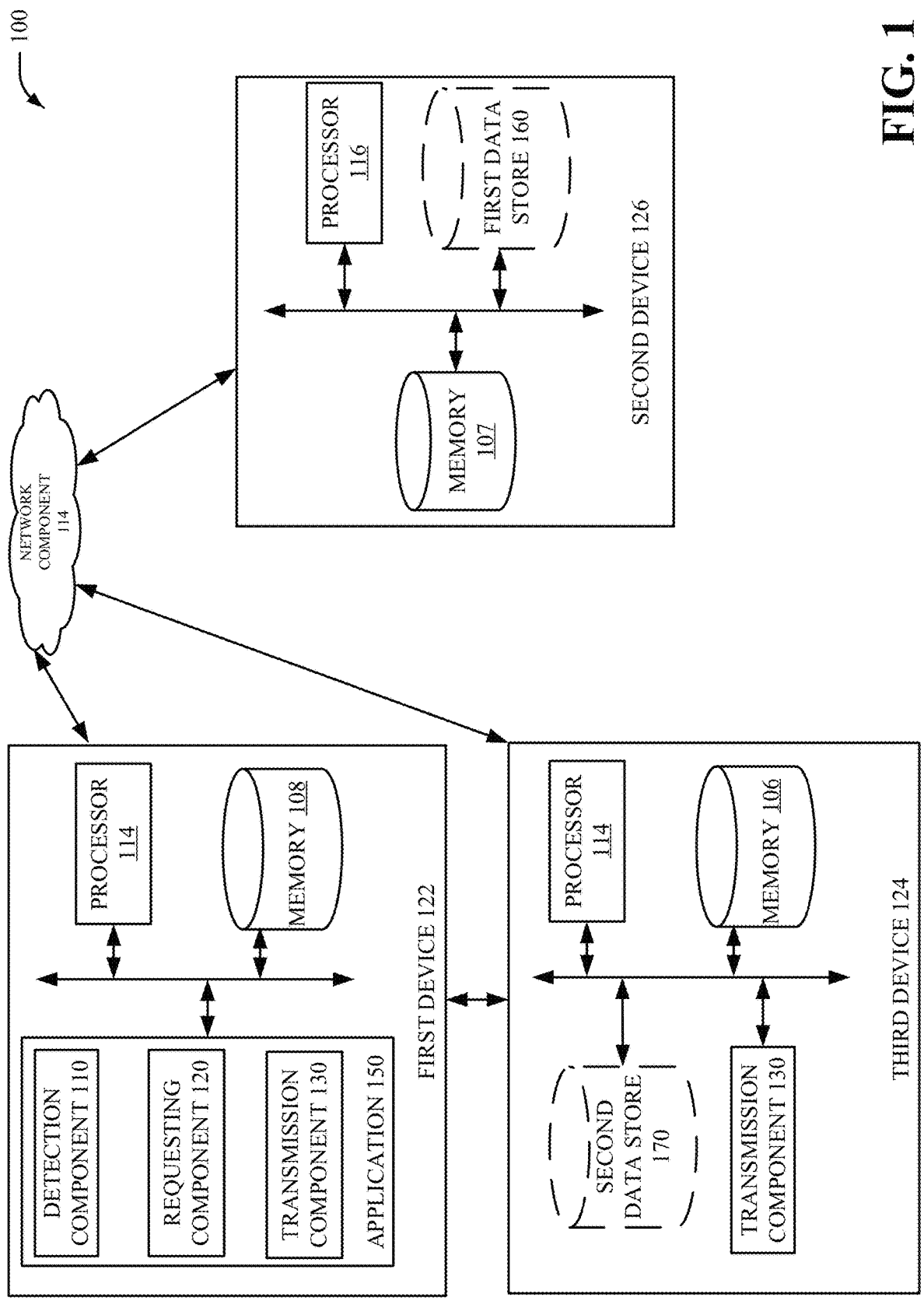

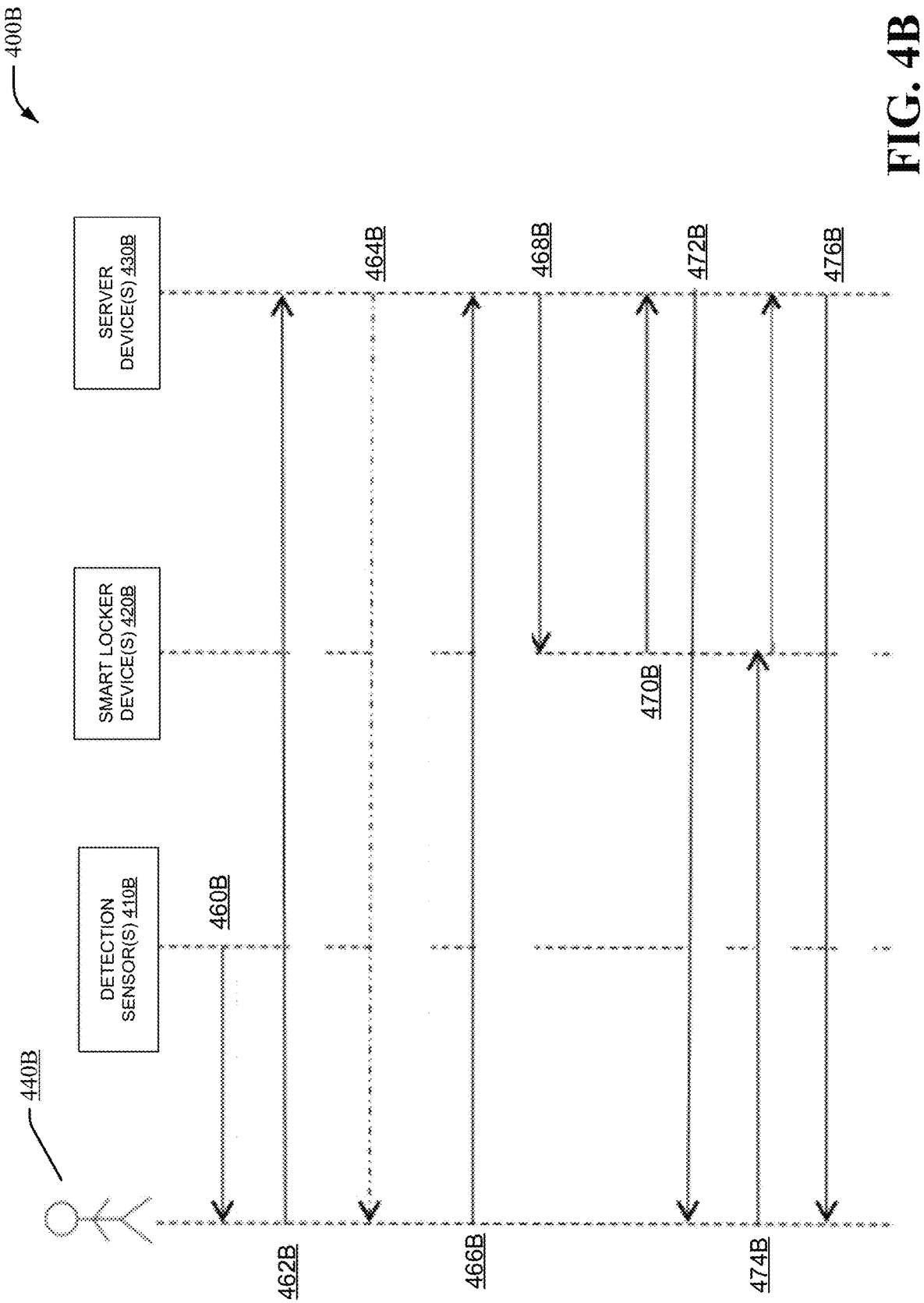

SMART LOCKER AGNOSTIC OPERATING PLATFORM ENABLED RETRIEVAL OF ITEMS

CROSS-REFERENCE TO RELATED APPLICATION

This application claims priority to and claims the benefit of priority to U.S. patent application Ser. No. 17/086,391, filed on Oct. 31, 2020 and entitled "SMART LOCKER AGNOSTIC OPERATING PLATFORM" and U.S. application Ser. No. 16/013,930, filed on Jun. 20, 2018, and entitled "FACILITATING RETRIEVAL OF ITEMS FROM AN ELECTRONIC DEVICE", which claims priority to both U.S. Provisional Application No. 62/525,973 filed on Jun. 28, 2017, and entitled "FACILITATING RETRIEVAL OF ITEMS FROM AN ELECTRONIC DEVICE" and U.S. Non-Provisional patent application Ser. No. 15,092,585 filed on Apr. 10, 2015 and entitled "SMART MAILBOX SYSTEM". The entirety of the disclosures of the aforementioned applications is considered part of, and is incorporated by reference in, the disclosure of this application.

BACKGROUND

Given the prominent rise of technologies related to the internet of things, there are new issues and problems associated with such new technologies. In an instance, an electronic storage locker device can facilitate a convenient and effective experience for consumers to store items such as packages. However, several mechanisms for accessing the packages from the electronic storage locker device are antiquated and inefficient. For instance, upon the receipt of a parcel within a locker compartment, a user can receive a code that can be used to gain access to the locker compartment storing the package. However, the user must enter such code into the console screen of the electronic storage locker device in order to open the relevant locker compartment and obtain the package. Unfortunately, a user can often lose such code and must troubleshoot or engage with technical support personnel to learn the code again causing time delays, frustration and inconvenience to the user. Furthermore, a user can also experience long queue times, in which, they must wait behind other users to access the console of the electronic storage locker device and retrieve the package. For instance, during busy periods after work many users may seek to retrieve their packages from a locker, however, the requirement to enter a code at a single user interface of the storage locker creates a queue in which users have to wait in order to enter their code and retrieve their package. Given the problems associated with retrieving packages, new, innovative, and improved solutions are needed to enhance the efficacy of package retrieval.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods that employ system components to facilitate a transmission of data, instructions, and information between a first device and a second device to provide or deny access of the first device to storage items.

According to an embodiment, a system is provided. The system comprises one or more processors; and one or more storage devices comprising processor executable instructions that, responsive to execution by the one or more processors, cause the system to perform operations. In an aspect, an operation can comprise transmitting, by a smart locker device, token data representing a location and identification of the smart locker device within a predefined broadcast range, wherein the smart locker device comprises a set of storage compartments configured to receive a set of delivery items within at least a subset of storage compartments, wherein the set of storage compartments are accessible by a set of doors connected to the set of storage compartments.

In another aspect, the system operations can comprise continuously monitoring, by an application executing on a first user device, for a presence of the token data within a pre-defined proximity of the application executing on the first user device. In yet another aspect, a system operation can comprise detecting, by the application executing on the first user device, the token data corresponding to the smart locker device based on satisfaction of detection criteria and a detection threshold, wherein the detection criteria comprises a target signal type, a target signal proximity, an identity of the smart locker device, a proximal range of signal frequency, a detected level of signal strength, and a recognized signal origin, wherein the detection threshold comprises a data value corresponding to the detection criteria.

Furthermore, another system operation can comprise automatically determining, by the application executing on the first user device, the identity of the smart locker device based on an analysis of data subsets of the token data comprising at least in part universally unique identifier, major version identifiers, and minor version identifiers corresponding to the smart locker device. In another aspect, system operations can comprise requesting, by the application executing on the first user device, from a server device a set of storage data, service characteristics, executable operations and attributes of the smart locker device. Also, in an aspect, system operations can comprise authenticating, by the server device, the application executing on the first user device for permission to receive the set of storage data, the service characteristics, the executable operations, and the attributes of the smart locker device, wherein the set of storage data comprise at least in part whether a package associated with the application executing on the first user device is stored within a storage compartment of the set of storage compartments.

Furthermore, the system operations can comprise transmitting, by the server device, a first subset of storage data or a second subset of storage data to the application executing on the first device, based on identification data associated with the first device, wherein the first subset of storage data represents instructions to open one or more compartment elements of the smart locker device, and wherein a second subset of storage data represents information corresponding to an absence of stored items at the smart locker device. In yet another aspect, the system operations can comprise unlocking, by the smart locker device, the one or more compartment elements of the smart locker device based on unlocking instructions received from the server device and initiated by the user device.

BRIEF DESCRIPTION OF THE DRAWINGS

FIG. 1 illustrates a block diagram of an example, non-limiting system that can facilitate an opening of a compartment element of a second device from a first device in accordance with one or more embodiments described herein.

FIG. 4B illustrates a flow diagram of an example, non-limiting computer-implemented method that can facilitate an opening of a compartment element of a second device from a first device in accordance with one or more embodiments described herein.

DETAILED DESCRIPTION

Figure 2A:
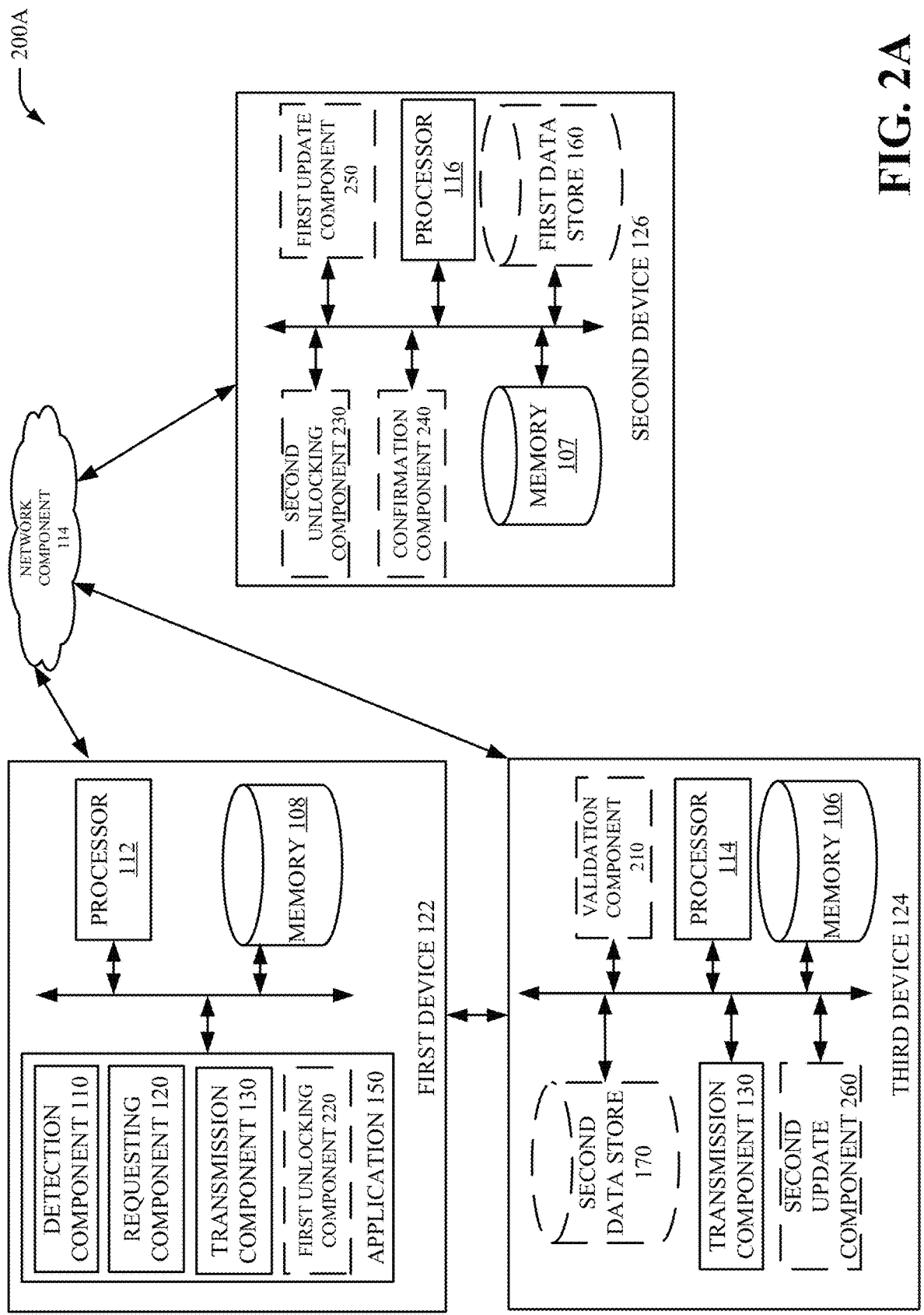
FIG. 2A illustrates a block diagram of an example, non-limiting system that can facilitate an opening of a compartment element of a second device from a first device in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In an aspect, a cloud computing implementation is recited herein, however, the subject disclosure is not limited to utilizing a cloud computing environment. In an aspect, cloud computing can refer to a service model for providing or enabling a convenient, on-demand access to a network that can include a shared pool of computing resources (e.g., networks, network bandwidth, servers, processing, memory, storage, applications, virtual machines, and services) capable of configuration and able to be rapidly deployed for use with other devices and requires limited management. This cloud model may include characteristics such as on-demand self-service, measured service, rapid elasticity, broad network access, and/or resource pooling.

Furthermore, cloud computing can be deployed using any of several service models such as the software as a service model, the infrastructure as a service model and/or the platform as a service model. In another aspect, the cloud computing model can be deployed using any of numerous deployment models such as a hybrid cloud model, a public cloud model, a private cloud model and/or a community cloud model. A notable feature of a cloud computing model is the relationship of numerous connected nodes that form a network. These networks allow for the interoperability of several devices. For instance, in an aspect, a local computing device can communicate with consumer devices (e.g., smart phones) using a cloud computing network of nodes. The cloud environment allows for personal devices to not require the maintenance of resources on a local device and instead utilize the cloud as an infrastructure or extension of the personal device. In an aspect, the cloud can include several layers such as a hardware layer, a software layer, a virtualization layer, a management layer, workload layer, an analytics processing layer, a software development layer and a command layer in our subject disclosure that allows for the communication with a locker device from a personal user device by utilizing a cloud infrastructure.

FIG. 1 illustrates a block diagram of an example, non-limiting system 100 that can facilitate an opening of a compartment element of a second device from a first device in accordance with one or more embodiments described herein.

In an aspect, system 100 can comprise network component 119, first device 122, second device 126, and third device 126. In an aspect, first device 122 can comprise detection component 110, requesting component 130, memory 108, processor 114, and application 150. In another aspect, second device 126 can comprise first data store 160, memory 107, and processor 116. In yet another aspect, third device 124 can comprise second data store 170, transmission component 130, processor 118, and memory 106. In an aspect, processor 112, processor 116, and processor 118 can execute the computer executable components and/or computer instructions stored in memory 108, memory 107, and memory 106 respectively. In an aspect, one or more of the components of system 100 can be electrically and/or communicatively coupled to one or more devices of system 100 or other embodiments to perform one or more functions described herein.

In an aspect, a memory 108 can store computer executable components and one or more processor 112 can execute the computer executable components stored in the memory 108, wherein the computer executable components comprise a detection component 110 that detects, by an application 150 executing on a first device 122, signal data corresponding to a second device 126; a requesting component 120 that requests, by the application 150 executing on the first device 122, from a third device a set of storage data corresponding to the second device 126; and a transmission component 130 that transmits, by the third device 124, a first subset of storage data or a second subset of storage data to the application 150 executing on the first device 122, based on identification data associated with the first device 122, wherein the first subset of storage data represents instructions to open one or more compartment elements of the second device 126, and wherein the second subset of storage data represents information corresponding to an absence of stored items at the second device 126.

In an aspect, the systems, methods and program products described herein enable user devices (e.g., first device 122) to open locker compartments (e.g., one or more compartment elements) capable of storing one or more item (e.g., package belonging to the user) wherein each locker compartment can be within second device 126 (e.g., storage locker device described in U.S. patent application Ser. No. 15/092,585) also referred to in some non-limiting embodiments as a smart locker. In an aspect, first device 122 can be a mobile device, smart phone, personal digital assistant, tablet and other such device that can execute system components of an application 150 (e.g., a software application designed particularly for a device such as a portable smart phone) to facilitate the unlocking and access to compartments within a second device 126 that is an electronic storage locker device (e.g., such as storage locker device described in U.S. patent application Ser. No. 15/092,585). In an aspect, system 100 can utilize wireless communication technologies such as BLUETOOTH® technology to facilitate the access to such compartments within second device 126 using first device 122.

In an aspect, second device 126 can be a smart mailbox device or digital locker device comprising one or more storage compartments, where second device 126 comprises hardware elements, software elements, and a physical structure that facilitates the secure storage, delivery, and/or retrieval of items (e.g., packages, mail, articles, etc.). In an aspect, one or more components of system 100 can be employed by second device 126 to facilitate the performance of operational activities by second device 126 (e.g., locking, unlocking, authorizing access to packages, authenticating users, etc.). In an aspect, second device 126 can include any of several of embodiments of second device 126 including, but not limited to, a storage locker device with compartments accessible via one or more door, where the compartments can vary in size, shape, and dimensions. In a non-limiting embodiment second device 126 can comprise storage compartments that are configured to store various items via controlled temperature settings, in accordance with compartment weight load capabilities, infrared sensor detection capabilities (to detect the presence or absence of a package in a compartment).

In an aspect, system 100 can communicate between several devices via a network component 119, where network component 119 can be an online network (e.g., wide area network such as the Internet or other area network such as the local, wide, or metro networks), intranets, satellite networks, other computer networks such as voice or data mobile phone networks or an offline network, or any combinations thereof. In an aspect, application 150 can be configured to execute on the end of first device 122 that can comprise a memory 108 that stores computer executable components and a processor 114 that executes computer executable components stored in the memory 108. In an aspect, first device 122 can include a smart phone, a tablet, a personal computer, a server, a router, a network PC, a workstation a microprocessor appliance, a peer device, or other network node.

Furthermore, in an aspect, processor 112 of first device 122 can execute detection component 110, that can be a part of application 150, to detect signal data corresponding to a second device 126. In an aspect, the detection of signal data can include indicating, on the first device 122, the presence of signal data (e.g., BLE signal) to satisfy a detection threshold. For instance, if the detected signal data meets criteria (e.g., type of signal, proximity of signal, identity of device emitting signal, detected frequency range or bandwidth, detected signal strength, signal quantitative measures, geographic origin of signal, etc.) that represents a data value above a threshold data value corresponding to the detection threshold, then the signal can be deemed to be detected. In an aspect, the data value of the signal data can represent a ratio of various detection factors or parameters that can be detected to be compared to the detection threshold data value.

In another aspect, the signal data can represent a transmission signal (e.g., radio signal) from a sensor technology such as Bluetooth Low Energy (BLE) technology (e.g., beacon, token), video sensor, Wi-Fi sensor, cellular positioning sensor, camera or video based sensor, MEMS sensor, global positioning sensor, or other such sensors integrated into second device 126. For instance, second device 126 can be a smart locker that employs a BLE token that communicates with first device 122 via detection component 110 and using a wireless communication system (e.g., BLE technology). In an aspect, the detection component 110 can continuously or intermittently check for the presence of the BLE token integrated with the communication system of second device 126. The BLE technology can be emitted by second device 126 and detected (e.g., using detection component 110) by first device 122 (e.g., smart phone, etc.) based on execution of a micro-location technology such as GPS technology in connection with BLE. In an instance, detection component 110 electronically coupled to first device 122 can check for the presence of BLE tokens within a target range of the mobile device to constantly verify that the user is indeed present. In an instance, should a user depart within a target range of first device 122, then the first device 122 and second device 126 can lose contact and second device 126 can secure itself against any access until communication with a valid BLE token (e.g., within a first device 122) is detected.

In an instance, second device 126 can be one or more non-limiting embodiments of a smart locker or smart mailbox device that comprises hardware and software elements within a physical structure that facilitates secure storage, delivery, and/or retrieval of items (e.g., packages, mail, articles, etc.). Furthermore, second device 126 can employ systems disclosed herein as well as systems that facilitate the performance of operations associated with storing, delivering, and/or retrieval of items. In another aspect, second device 126 can include compartments with various capabilities such as refrigeration, heating, dimensional adjustment capabilities, weighing capabilities, expansion or contraction, drone drop capabilities, biometric access capabilities, and other such capabilities.

In another aspect, second device 126 can employ a BLE token capable of transmitting or emitting a BLE radio signal. In an aspect, the second device 126 with integrated BLE token can be configured with identification data that represents a universally unique identifier (UUID), a major value, and/or a minor value. In an aspect, the UUID can identify services, characteristics, and/or descriptors referred to as attributes that correspond to each unique second device 126. In another aspect, the UUID can be transmitted (e.g., from a BLE token within second device 126) and detected (e.g., using detection component 110) by the first device 122 and/or notify another device of the services provided by the second device 126. Furthermore, a service can be a collection of data, characteristics, or associated behaviors conducted by second device 126.

Also, any services related to second device 126 can be enabled by BLE technology. In another aspect, the UUID can save air time of transmission and memory space. In an aspect, a major version or major value can identify and distinguish a location of one or more storage locker associated with such major value. Also, in an aspect, a minor version can identify and distinguish a particular beacon communicatively coupled to a BLE token employed by second device 126. For instance, a beacon can be positioned in peripheral locations to the second device 126 in order to facilitate greater connectivity between first device 122 and second device 126. Accordingly, in a non-limiting embodiment, detection component 110 can be configured with an application 150 to continuously monitor and/or detect whether a BLE region is present via detection of a UUID associated with a second device 126. Upon a first device 122 entering a region encompassed by a BLE signal, first device 122 can trigger notification data representing a notification (e.g., message, vibration of first device 122, or other notification mechanism) to inform first device 122 that a BLE region has been detected. For instance, processor 112 can employ detection component 110 via application 150 to detect and read the signal data comprising UUID information, major version information, and minor version information that is transmitted from a BLE token integrated with second device 126.

In a non-limiting example, detection component 110 can detect a signal (e.g., radio signal, data signature, etc.) emitted by a BLE token within second device 126. In another aspect, application 150 operating on first device 122 can transmit data representing a request (e.g., requesting component 120) for information related to packages belonging to first device 122 to third device 126. Accordingly, third device 124 can receive the transmitted data from first device 122 and retrieves a set of storage data associated with first device 122, where the set of storage data represents information regarding packages or items stored at second device 126 belonging to first device 122. Furthermore, in an aspect, storage data can represent a courier name, a bar code tracking identifier on a package, image data or video data of a package, and other such data that can be stored in a package retrieval data model (e.g., table). Furthermore, storage data can be captured when a courier drops of a package into a locker compartment such that a scanner (within a smart locker compartment) can scan information associated with the package.

As such a non-limiting embodiment can include a first device 122 detecting (e.g., using detection component 110) second device 126 by receiving the radio signal and corresponding BLE token data associated with such radio signal. In an aspect, upon detection of second device 126 by first device 122, a pairing operation can occur in which the first device 122 and the second device 126 can communicate (e.g., transmit data, instructions, commands, information) with one another. Furthermore, an authentication operation can be conducted by either or both of first device 122 and second device 126 to ensure that both devices are authorized to communicate with one another. For instance, upon detection of BLE token data by first device 122, such device can identify second device 126 as an authorized device and begin transmitting data and/or information to such device.

As such, processor 112 can deploy requesting component 120 that can be integrated into application 150 executing on the first device to transmit the signal data (e.g., UUID information, major version, and minor version information) to a third device 124 to authenticate first device 122 and/or access storage data representing information related to the presence or absence of packages stored in compartments of second device 126 and such packages corresponding to first device 122. In any non-limiting embodiment of the subject matter, third device 124 can be a back-end server component (e.g., a data server), a middleware server component (e.g., an application server) or a front-end server (e.g., a client computer having a graphical user interface or web browser through which a user can interact with an implementation of the systems, methods, computer program products, or any combination thereof, etc.). In an aspect, the components described herein can be interconnected by any form or medium of digital data communication (e.g., network component 119, LAN, WAN, Internet, ad hoc peer-to-peer networks, etc.). Furthermore, in some embodiments, the third device 124 can be one or more server such as a client server that is generally remote from other devices and interacts via network component 119. In other embodiments, the relationship of third device 124 can be as a client-server where system 100 programs execute on respective devices and third device 124 transmits data (e.g., storage data, authentication data, permission data, etc.) to a first device 122 and/or second device 126. For instance, input data can be generated at first device 122 and received by third device 124.

In a non-limiting embodiment, upon requesting component 120 requesting third device 124 for authentication data and storage data, third device 124 can perform an authentication operation then can access storage data. Accordingly, in an aspect, third device 124 can employ an authentication technology that utilizes identification data associated with first device 122 such as device authentication token data stored within application 150 and memory 108. Furthermore, in an aspect, third device 124 can facilitate a comparison of the device authentication token data to database token data representing valid tokens (such data can be stored at a first database). As such, in an aspect, third device 124 can determine whether the first device 122 is a valid device or invalid device. Upon a determination of first device 122 being a valid device, third device 124 can compare the BLE token data (e.g., UUID information, major version information, minor version information) to storage data (e.g., stored at the first database or a second database). For instance, third device 124 can request performance of a query operation to compare the identification information (e.g., token data) corresponding to first device 122 to storage data corresponding to signal data (e.g., location ID, presence of package within compartments at a particular location).

Accordingly, upon third device 124 accessing and determining the presence of a package (e.g., represented by package data) in one or more compartment of second device 126, third device 124 employs transmission component 130 to transmit a first subset of storage data to application 150 executing on first device 122 based on identification data associated with first device 122, wherein the first subset of storage data represents instructions to open one or more compartment elements of second device 126, and wherein the second subset of storage data represents information corresponding to an absence of stored items at second device 126. As such, third device 124 can employ processor 118 to execute transmission component 130 to transmit storage data such as a compartment or locker number that has a package for first device 122, other mailrooms or smart lockers that may have other packages for first device 122, information about the package delivery (e.g., time of delivery, deliverer details, special instructions, etc.), and other such information.

As such, in a non-limiting embodiment, storage data can be transmitted between third device 124 and second device 126. In an aspect, third device 124 can be a server device. Furthermore, in an aspect, the server device can comprise second data store 170 capable of storing and managing collections of data which can include databases, files, e-mails, transactional data associated with second device 126, and other such items. In another aspect, third device 124 can act as a management system to manage operations and activities between several devices (e.g., first device 122, second device 126, third device 124). Furthermore, third device 124 can transmit the set of storage data to the application 150 executing on first device 122. In an aspect, application 150 of first device 122 can present, at a user interface, an option to submit input data (e.g., by pressing an open lockers button on a mobile device) representing an opportunity to choose to unlock one or more containment compartments of second device 126 that contain packages or items belonging to first device 122.

In another aspect, first device 122 via application 150 can receive the transmitted storage data from third device 124. Furthermore, based on such storage data, first device 122 can employ a mechanism to receive input data from an interface (via a graphical user interface that can be executed on an application server or first device 122) of first device 122 that corresponds to a capability of unlocking and/or locking storage locker compartments of second device 126 based on permissions granted to such first device 122 (e.g., if a package belonging to first device 122 exists in such compartment). As such, in an aspect, the input data (e.g., received based on a pressing of an open lockers button at a GUI) representing instructions to unlock the one or more containment compartments of second device 126, can be transmitted to third device 124. Upon receiving the input data, third device 124 can transmit the unlock command and/or instructions to second device 126 to open the one or more containment compartments that contain packages or contents belonging to first device 122. In an aspect, the instructions transmitted by third device 124 can be secured as an authenticated message that instructs second device 126 to open only those compartments that contain packages for the first device 122. The disclosed systems, program products, and methods, and disclosed subject matter facilitates the management and of access to packages and prevents the occurrence of waiting lines at mail storage rooms or electronic locker devices. As such, the smart locker technology integrated with devices such as smart phones and servers can provide an improved technology that promotes package pickup efficiencies where hundreds of users can simultaneously retrieve packages in an instance. Furthermore, users are not bottlenecked by interfacing with single consoles. For instance, users do not have to input information into a single dedicated console attached or connected to second device 126 in order to gain access to one or more containment compartment. Instead, system 100 allows every user to utilize a device such as a mobile device to communicate with second device 126 and third device 124 in order to unlock containment compartments and access packages, items, and contents corresponding to each respective device. Accordingly, the disclosed technology provides an efficacious and novel mechanism for gaining access to packages using mobile devices.

In another non-limiting embodiment, the BLE token can be linked to one or more blockchain to facilitate a maintenance of a list of records and/or transactions associated with the second device 126. For instance, each second device 126 can store its transactions on a separate block chain. Thus, where there are a bank of 25 smart lockers in 25 different locations, each smart locker can store its transactions on its own dedicated blockchain. Furthermore, the blockchain can facilitate management of security and access to resources (e.g., smart locker compartment access) associated with blocks of a decentralized distributed blockchain network. In an aspect, the blockchain network can provide the ability to validate resources, such as the individual or entity that is permitted access and operational control over a locker compartment (e.g., administrator of locker compartments, consumer, etc.). Furthermore, in an aspect, the blockchain can allow others to grant control over smart locker compartments to other individuals or third parties (e.g., administrator granting control to customer).

Turning now to FIG. 2A, illustrated a block diagram of an example, non-limiting system 200 that can facilitate an opening of a compartment element of a second device from a first device in accordance with one or more embodiments described herein. Repetitive description of like elements employed in other embodiments described herein is omitted for sake of brevity.

In an aspect, system 200A can comprise network component 119, first device 122, second device 126, and third device 126. In an aspect, first device 122 can comprise detection component 110, requesting component 130, memory 108, processor 114, and application 150. In another aspect, second device 126 can comprise first data store 160, memory 107, and processor 116. In yet another aspect, third device 124 can comprise second data store 170, transmission component 130, processor 118, and memory 106. In an aspect, processor 112, processor 116, and processor 118 can execute the computer executable components and/or computer instructions stored in memory 108, memory 107, and memory 106 respectively. Furthermore, system 200 can also comprise validation component 210, first unlocking component 220, second unlocking component 230, confirmation component 240, and first update component 250, and second update component 260. In an aspect, one or more of the components of system 100 can be electrically and/or communicatively coupled to one or more devices of system 100 or other embodiments to perform one or more functions described herein.

In an aspect, validation component 210, executed by processor 118 on third device 124, can authorize the first device 122 to retrieve the first subset of storage data based on the identification data. For instance, validation component 210 can utilize an identifier associated with first device 122 that allows third device 126 to recognize, authenticate, grant permission to, and communicate with first device 122. In an instance, validation component 210 executed by processor 118 of third device 124 can utilize any of several validation techniques to authenticate first device 122 including, but not limited to, a public key infrastructure (PKI), possessing unique identifier data, requiring a proper digital signature, utilizing a token identifier mechanism, and other such techniques.

Furthermore, an authentication application executing on third server device 124 can compare a user authentication level to a database of authentication levels to determine a level of access a user may have. For instance, a device owned by a package delivery company may have restricted access to a storage locker (e.g., can only unlock the compartment once to drop off the package) versus a first device 122 whom owns the package may have full access to open the compartment until the package is removed. In an aspect, a level of authentication may allow for compartment unlocking and allow for privileges to dock a drone on a smart locker compartment configured to receive drone dropped packages. Furthermore, in another aspect, other controllable features of second device 126 can be accessed or denied accessed based on validation or authentication permissions. In another aspect, validation component 120 can utilize several layers of validation or authentication techniques to allow for access to a smart locker compartment (e.g., facial recognition, password entry, identification data of device matching). In another aspect, authentication data can be stored in a data storage unit, cloud computing environment, or any other location. In yet another aspect, based on a comparison of the authentication data to valid authentication data on a database, validation component 120 may allow any device varying permissions to access a first percentage of configurable operations on the smart locker and such varying percentages of control can range from device to device.

In another aspect, system 200 can employ a first unlocking component 220 that transmits, by the application 150 executing on the first device 122, unlocking data representing instructions to unlock the one more compartment elements of the second device 126, to the second device 126 based on an authorization from third device 124. Accordingly, first unlocking component 220 can facilitate a transmission of data from first device 122 to third device 124 to transmit a command to unlock respective compartment elements of second device 126. In another non-limiting embodiment, first device 122 can transmit the unlocking command (e.g., using unlocking component 220) to second device 126 (in the absence of third device 124).

In yet another aspect, confirmation component 240 can transmit confirmation data from second device 126 to third device 124, wherein the confirmation data represents the opening of one or more compartment elements of second device 126. In an instance, confirmation component 240 can transmit confirmation data that represents an occurrence of a transaction, event, or activity in association with received instructions, command or information. In another aspect, system 200 can employ a first update component 250 that transmits state data from the second device 126 to the third device 124, wherein the state data represents at least one of a locked state, an unlocked state, a re-locked state, a storage state, or an empty state of the one or more compartment elements. As such, in an aspect, processor 116 can execute update component 250 to transmit update data (e.g., in addition to confirmation data, etc.) to third device 124. For instance, update component 250 can transmit update data that represents a change in status of second device 126 such as a change from an occupied compartment to a vacant compartment, a change from a locked state to an unlocked state, a change from an unlocked state to a locked state, a change in temperature of the environment within the compartment, a change in administrative settings or other such changes. Furthermore, in a non-limiting embodiment, update data can be collected and stored at a data store (or at third device 124) such that the update data can be queried by other devices (e.g., third device 124).

In an instance, state data (which can be transmitted as a subset of update data) can represent a transition of the state of one or more compartment within second device 126 to another state based on an occurrence of an activity associated with second device 126 and such transition state can be represented by data where such data is transmitted to third device 124. Accordingly, in an aspect, upon an occurrence of any one or more of a pairing event (e.g., between first device 122 and second device 126), an unlocking event (e.g., unlocking of a compartment within second device 126), a locking event (e.g., a locking of a compartment within second device 126), a placing of a package (or other item) within second device 126, a removal of a package from second device 126 or any other such event, first update component 250 can transmit state data updating the state of device 126 to third device 124.

In another aspect, processor 118 can execute second update component 260 that transmits state data (which can act as a subset of update data) from third device 124 to application 150 executing on first device 122. In an aspect, second update component 260 can transmit state data and other data associated with second device 126 to first device 122. For instance, if target compartments of second device 126 have been unlocked, then third device 124 can transmit state data regarding the unlocked state of second device 126 compartments to first device 122. Furthermore, application 150 can update commands, capabilities, and information associated with functionality of application 150 based on the updated state information.

For instance, if the compartments are already unlocked, application 150 can remove data associated with allowing a user an option to unlock compartments of second device 126 presented at a user interface of first device 122. In yet another aspect, system 200 can further comprise a second unlocking component 260 that unlocks the one or more compartment elements based on receipt of the unlocking data. As such, second device 126 can unlock (e.g., using second unlocking component 240) respective compartments (e.g., lockers) based on receipt of a command transmitted (e.g., using first unlocking component 220) from first device 122 to unlock the compartments.

In an instance, a server (e.g., third device 124) can transmit an authenticated message to a smart box locker unit (e.g., second device 126) to unlock respective locker units that contain packages corresponding to first device 122. The second device 126 can then unlock (e.g., using second unlocking component 240) based on the command. Accordingly, second device 126 can transmit update data (e.g., using first update component 250) to first device 122 and third device 124 regarding the occurrence of the unlocking activity. Also, in an aspect, a user of first device 122 can retrieve the packages from the unlocked compartments and close the compartment doors.

Again, in an aspect, second device 126 can transmit (e.g., using first update component 250) data regarding the occurrence of the closing of the compartment door. Also, third device 124 can transmit (e.g., using second update component 260) data to update the application 150 to remove permission to unlock and open the locker compartment again. In yet another aspect, second unlocking component 230 can facilitate the execution of other operations of second device 126 such as adjustment of a temperature within the compartment environment, or adjustment of a weight threshold that can be sustained within the compartment. In yet another non-limiting embodiment, the smart lockers (e.g., second device 126) can perform an automatic (no manual assistance required) close or open operation based on a received set of instructions. In another aspect, second update component 260 of third device 124 can transmit update data to application 150 of first device 122 such that the application 150 reflects the current (updated) state of second device 126. For instance, upon a compartment transitioning from occupied to vacant, the application 150 can indicate via a graphical user interface the state of the compartment being empty and the inability of the first device 122 to open the compartment.

In a non-limiting example, application 150 executed on first device 122 can display one or more open locker graphic (e.g., using a GUI) on an interface of first device 122 corresponding to each locker compartment containing a package or item for first device 122. Furthermore, the user interface can receive input data based on activation (e.g., touching a screen) of the one or more open locker graphic to open the compartment doors corresponding to each open locker graphic. Accordingly, in an aspect, application 150 can transmit the instructions to open the locker compartments to third device 124. Furthermore, in an aspect, third device 124 can authenticate such message or instructions and transmit a secure message to second device 126 to open the appropriate locker compartments where such opening operation is confirmed with third device 124 (e.g., using update data).

Furthermore, second device 126 can update (e.g., transmit update date) third device 124 with updated state information of second device 126 compartments. Furthermore, in an aspect, third device 124 can transmit update data to application 150 to update the state of second device 126 to be reflected at an interface presenting application 150 graphics at first device 122. In the event an issue or error arises application 150 can present an error message at the interface of first device 122. Furthermore, in an aspect, second device 126 transmits update data to third device 124 based on any additional status changes to second device 126 (e.g., a user retrieving a package and closing the door of a smart locker compartment). In an aspect, third device 124 can transmit update data to application 150 in order to update the interface as to the latest status of the second device 126. In another aspect, execution of multiple compartment operations can occur in parallel or simultaneously. Furthermore, in an aspect, third device 124 can be a multi-threaded cloud server that allows for a fast management of compartment operations concurrently.

In another non-limiting embodiment, in instances where a package is required to be delivered to a mailroom, application 150 can transmit a notification message that a package is in the mailroom instead of or in addition to a smart locker compartment such that application 150 can notify first device 122 of all packages present for such device. Also, in an aspect, all records related to transactions with a smart locker device (e.g., historical data) can be stored and accessed by the application 150. In another aspect, application 150 can employ a vacation notification that allows a mailroom to be notified if a user owning a first device 122 will be absent for a period of time (e.g., due to vacation or illness) and thus won't be able to pick-up a package form a prolonged period of time. As such, package storage logistics can be adjusted (e.g., moving a package from a locker compartment to a mailroom such that the compartment won't be occupied for an extended period of time). In yet another aspect, a set of administrative rules can be deployed to allow a management level device to implement logistical process flows for package management activities. For instance, after X days, packages not picked up within a compartment of a smart locker can be transferred to a mailroom for extended storage. In another aspect, an administrative portal can be created to allow for such implemented changes.

Figure 2B:
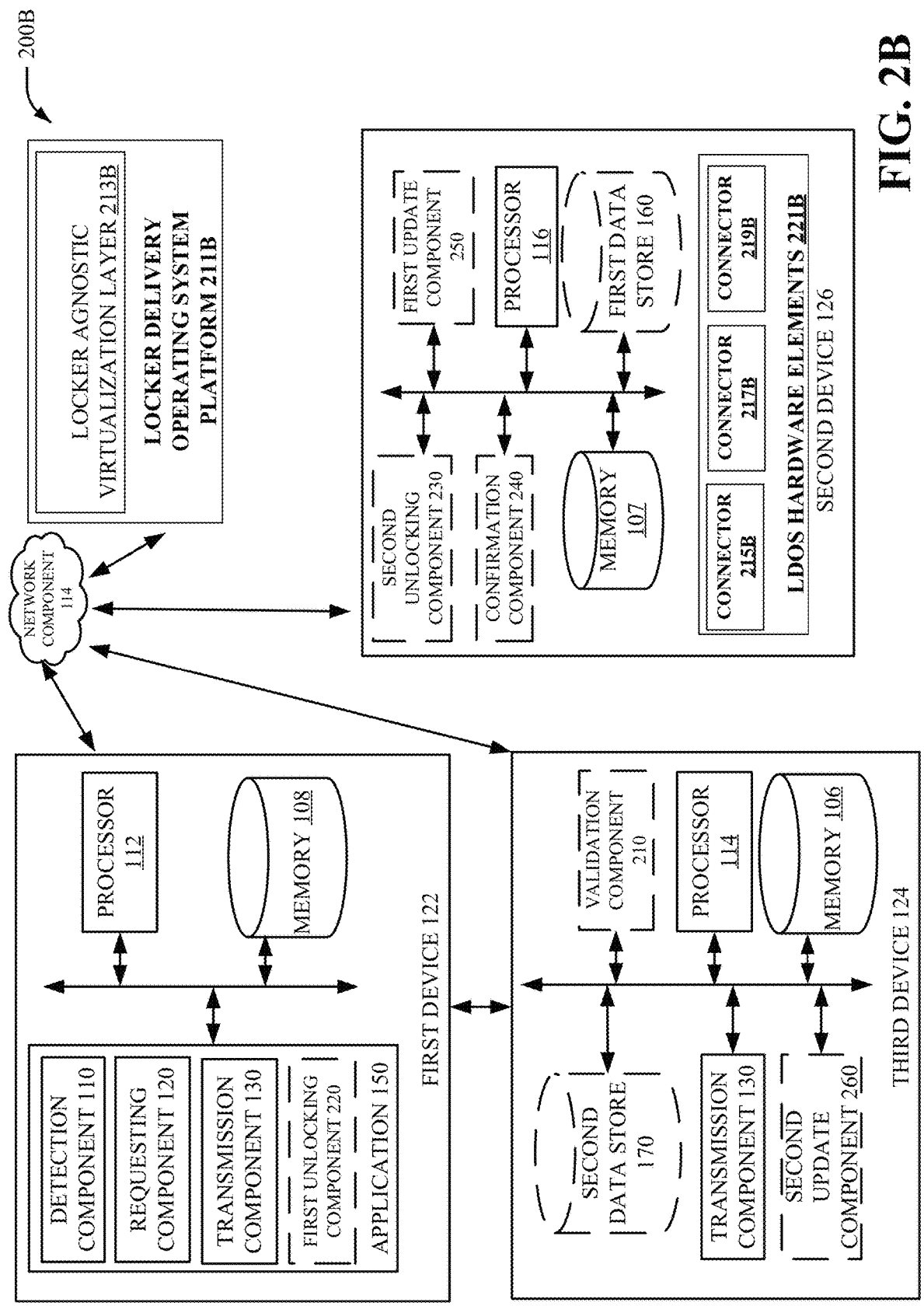
FIG. 2B illustrates a block diagram of an example, non-limiting system that can facilitate an opening of several smart lockers based on a locker delivery operating system platform in accordance with one or more embodiments described herein.

Turning now to FIG. 2B, illustrated a block diagram of an example, non-limiting system 200B that can facilitate an opening of a compartment element of a second device from a first device in accordance with one or more embodiments described herein. Repetitive description of like elements employed in other embodiments described herein is omitted for sake of brevity.

In an aspect, system 200B can comprise network component 119, first device 122, second device 126, and third device 126. In an aspect, first device 122 can comprise detection component 110, requesting component 130, memory 108, processor 114, and application 150. In another aspect, second device 126 can comprise first data store 160, memory 107, and processor 116. In yet another aspect, third device 124 can comprise second data store 170, transmission component 130, processor 118, and memory 106. In an aspect, processor 112, processor 116, and processor 118 can execute the computer executable components and/or computer instructions stored in memory 108, memory 107, and memory 106 respectively. Furthermore, system 200 can also comprise validation component 210, first unlocking component 220, second unlocking component 230, confirmation component 240, and first update component 250, and second update component 260. In an aspect, one or more of the components of system 100 can be electrically and/or communicatively coupled to one or more devices of system 100 or other embodiments to perform one or more functions described herein.

In an aspect, system 200B also discloses a locker delivery operating system platform 211B, locker agnostic virtualization layer 213B, LDOS hardware elements 221B, connector 215B, connector 217B, and connector 219B. In an aspect, locker agnostic virtualization layer 213B is a set of modules and components configured to communicate with a diversity of different smart locker hardware and corresponding modules. As such, locker agnostic virtualization layer 213B is an abstracted set of modules that can be integrated into any differentiated type of smart locker. Furthermore, in an aspect, LDOS hardware element 221B can include specific connectors connected to the motherboard of one or more smart locker device and other hardware elements (e.g., console unit) that connect to client devices (e.g., smart phones, desktop computers, etc.) such that locker agnostic virtualization layer 213B can communicate with LDOS hardware element 221B within any smart locker and control the operability of such smart locker, generate date, store transactional events, and integrate new functionality to such smart lockers incorporating LDOS hardware element 221B.

As such, smart locker device(s) can include any mix of hardware to be abstractly controlled by an virtualization layer 213B (e.g., via communication with LDOS hardware element 221B) employed by locker delivery operating system platform 211B. In an aspect, LDOS hardware element 221B can include connector 215B, connector 217B, and connector 219B, which can represent various connector architectures (e.g., RS-232, RS-485, Ethernet, etc.). Accordingly, LDOS hardware element 221B and the associated connectors can be integrated in a range of independent or combined smart locker devices. The smart locker devices can be discrete and configured according to various differing protocols, standards, and classifications. However, LDOS hardware elements 221B and such connectors allow any discrete and varied smart locker to be controlled via a common locker delivery operating system platform 211B employing virtualization layer 213B. In a non-limiting embodiment, virtualization layer 213B can execute on locker delivery operating system platform 211B executing on a tablet or other smart device that can be configured to integrate within a smart locker unit.

Accordingly, the sensors (e.g., BLE token) and/or beacons integrated in a smart locker device (e.g., second device 126) and a set of other discrete smart lockers can be controlled and integrated amongst several differing smart locker devices via virtualization layer 213B of locker delivery operating system platform 211B. As such, the automated detection of user devices and/or opening of smart locker compartments for several discrete lockers can be automatically executed, controlled, monitored, and accessed across several sets of discrete and independent smart lockers devices. For instance, second device 126 can be a smart locker that employs a BLE token that communicates with first device 122 via detection component 110 and using a wireless communication system (e.g., BLE technology) can employ LDOS hardware elements 221B to trigger a communication of an occurrence of user device detection or locker compartment opening of second device 126 or any other locker device.

As such, the detection component 110 of several smart lockers can continuously or intermittently check for the presence of the BLE token integrated with the communication system of second device 126 and other smart locker devices. The BLE technology can be emitted by second device 126 and the other smart locker devices, where it is detected (e.g., using detection component 110) by first device 122 (e.g., smart phone, etc.) and other client devices based on execution of a micro-location technology such as GPS technology in connection with BLE. In an instance, detection component 110 electronically coupled to first device 122 and other smart client devices can check for the presence of BLE tokens within a target range of the mobile device to constantly verify that the user is indeed present. Furthermore, if a group of discrete smart lockers comprising different component parts, different modules, different firmware, different communication protocols belong to a single owner, such group of discrete smart lockers with integrated LDOS hardware elements 221B can be commonly controlled by locker delivery operating system platform 211B. Furthermore, all the sensors and integrated components of such smart locker devices including the generation of respective smart locker events (e.g., automated compartment unlocking, door opening, door closing, etc.) can be controlled, configured, and managed under a unified locker delivery operating system platform 211B.

Figure 3:
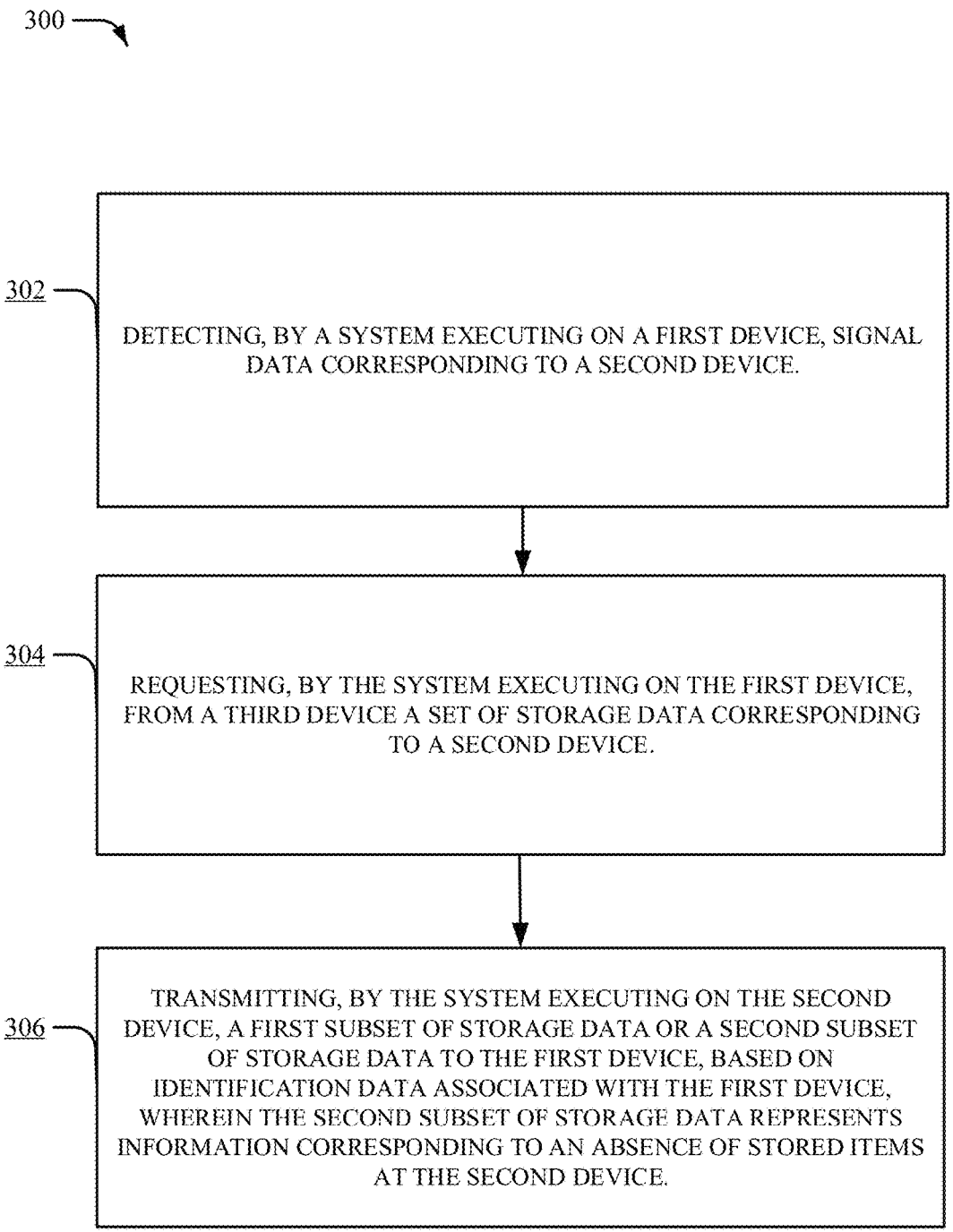
FIG. 3 illustrates a flow diagram of an example, non-limiting computer-implemented method that can facilitate an opening of a compartment element of a second device from a first device in accordance with one or more embodiments described herein.

FIG. 3 illustrates a flow diagram of an example, non-limiting computer-implemented method 300 that can facilitate an opening of a compartment element of a second device 126 from a first device 122 in accordance with one or more embodiments described herein. Repetitive description of like elements employed in other embodiments described herein is omitted for sake of brevity.

In an aspect, one or more of the components described in computer-implemented method 300 can be electrically and/or communicatively coupled to one or more devices. Repetitive description of like elements employed in other embodiments described herein is omitted for sake of brevity. In some implementations, at reference numeral 302, a system operatively coupled to a processor (e.g., processor 112) can detect (e.g., using detection component 110), by a system executing on a first device 122, signal data corresponding to a second device 126. At reference numeral 304, the system executing on the first device 122, can request (e.g., using requesting component 120) from a third device 124 a set of storage data corresponding to the second device 126. At reference numeral 306, the system executing on the third device 124, can transmit (e.g., transmission component 130) a first subset of storage data or a second subset of storage data to the application 150 executing on the first device 122, based on identification data associated with the first device 122, wherein the first subset of storage data represents instructions to open one or more compartment elements of the second device 126, and wherein the second subset of storage data represents an information corresponding to an absence of stored items at the second device 126.

Figure 4A:
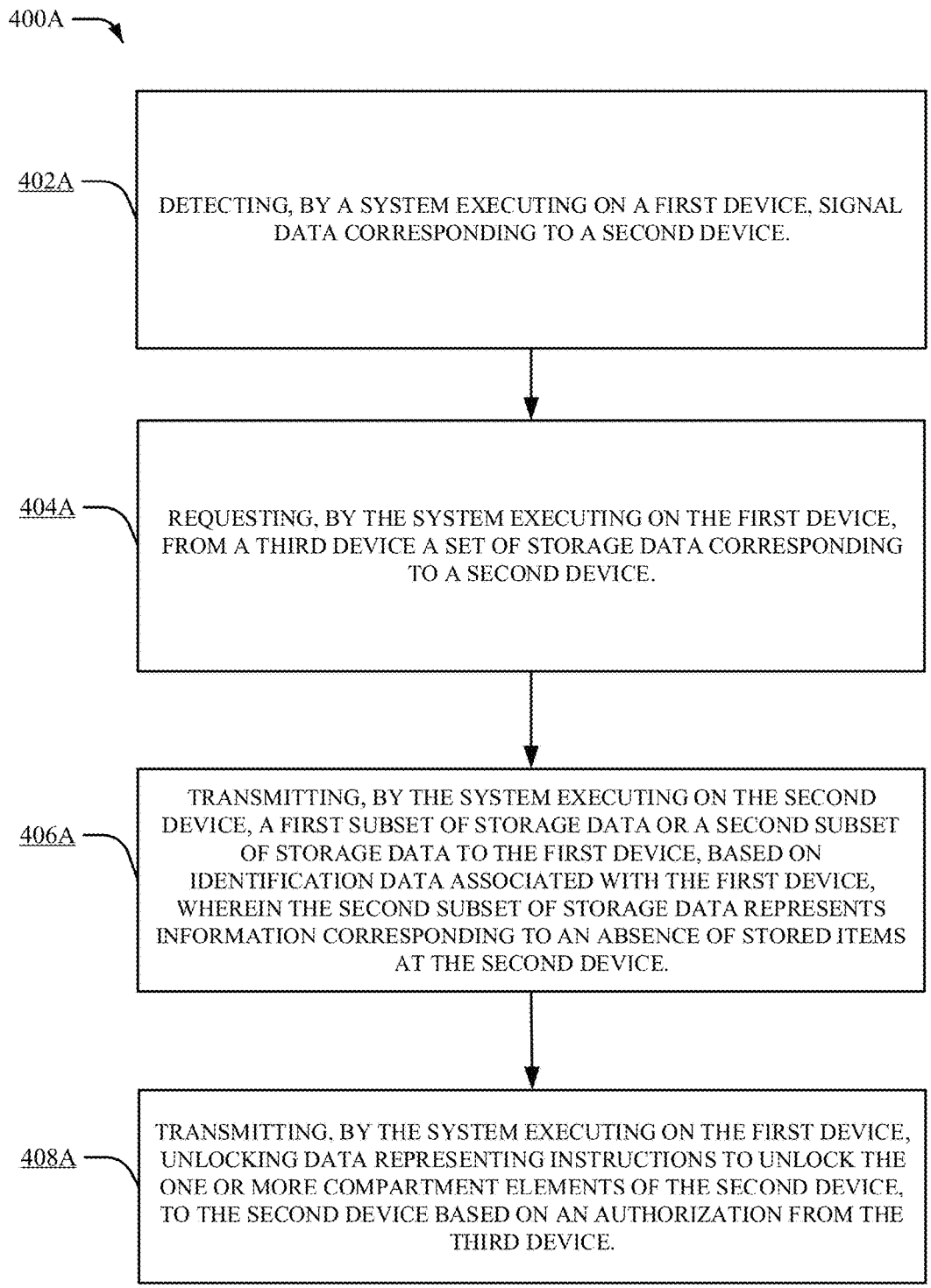
FIG. 4A illustrates a flow diagram of an example, non-limiting computer-implemented method that can facilitate an opening of a compartment element of a second device from a first device in accordance with one or more embodiments described herein.

FIG. 4A illustrates a flow diagram of an example, non-limiting computer-implemented method 400A that can facilitate an opening of a compartment element of a second device 126 from a first device 122 in accordance with one or more embodiments described herein. Repetitive description of like elements employed in other embodiments described herein is omitted for sake of brevity.

In an aspect, one or more of the components described in computer-implemented method 300 can be electrically and/or communicatively coupled to one or more devices. Repetitive description of like elements employed in other embodiments described herein is omitted for sake of brevity. In some implementations, at reference numeral 402A, a system operatively coupled to a processor (e.g., processor 112) can detect (e.g., using detection component 110), by a system executing on a first device 122, signal data corresponding to a second device 126. At reference numeral 404A, the system executing on the first device 122, can request (e.g., using requesting component 120) from a third device 124 a set of storage data corresponding to the second device 126. At reference numeral 406A, the system executing on the third device 124, can transmit (e.g., transmission component 130) a first subset of storage data or a second subset of storage data to the application 150 executing on the first device 122, based on identification data associated with the first device 122, wherein the first subset of storage data represents instructions to open one or more compartment elements of the second device 126, and wherein the second subset of storage data represents an information corresponding to an absence of stored items at the second device 126. At reference numeral 408A, the system executing on the first device 122, can transmit unlocking data representing instructions to unlock the one or more compartment elements of the second device 126 to the second device based on an authorization from the third device 124.

FIG. 4B illustrates a flow diagram of an example, non-limiting computer-implemented method 400B that can facilitate an opening of a compartment element of a second device from a first device in accordance with one or more embodiments described herein. Repetitive description of like elements employed in other embodiments described herein is omitted for sake of brevity.

Illustrated are user device 440B, detection sensors 410B (e.g., BLE token technology) communicatively coupled and/or affixed to a smart locker, smart locker device 420B, server device(s) 430B (e.g., cloud computing network, network of server(s), etc.). In an aspect at reference numeral 460B an application executing on user device 440B can be configured to detect a signal of detection sensors 410B (e.g., BLE signal). At reference numeral 462B, the application executing on user device 440B can transmit a package request (e.g., corresponding to a user identity of the user device) to server device(s) 430B, where the package request can be represented by a sensor token (e.g., BLE token). At reference numeral 464B, server device(s) 430B can transmit a message representing the presence or absence of a package within the respective smart locker device 420B. Furthermore, the application executing on user device 440B can render, via a user interface, a selection mechanism (e.g., button) to open a respective locker compartment storing a package corresponding to the user device 440B. At reference numeral 466B, in response to selection input, the application executing on user device 440B communicates with smart locker device 420B to open one or more locker compartments storing packages corresponding to the user device 440B.

At reference numeral 468B, server device(s) 430B can be configured to communicate, via secure and authenticated messages, to smart locker device 420B to open smart locker compartments only if such compartments comprise packages corresponding to the user device 440B. At reference numeral 470B, smart locker device 420B unlocks and opens the respective compartments corresponding to user device 440B in response to the command from server device(s) 430B. Furthermore, at reference numeral 470B, the smart locker device 420B can transmit information to update server device 430B as to the status of the smart locker, package, and user device 440B. At reference numeral 472B, server device(s) 430B can transmit update data to the application executing on user device 440B. At reference numeral 474B (first arrow), the user can retrieve the package from the locker and close the locker compartment. At reference numeral 474B (second arrow), the smart locker device 420B can update the server device(s) 430B as to the smart locker event (e.g., absence of package, compartment closed again). At reference numeral 476B, server device(s) 430B can update the application executing on user device 440B in order to prohibit the user device from permitting another opening of the smart locker compartment. In an aspect, the application executing on user device 440B can be authenticated by server device(s) 430B. In another aspect, server device(s) 430B can be a multi-threaded cloud server system configured to manage the operations concurrently. Furthermore, some operations can be executed in parallel or sequentially so quickly to provide the impression of parallel execution. In yet another aspect, locker delivery operating system platform 211B can be configured to execute many or all of such operations disclosed above, concurrently amongst a common group of independent, discrete, and differentiated smart lockers (e.g., different in protocols, hardware, modules, etc.). For instance, a set of differentiated smart locker device can comprise different secure communication modalities, broadcasting capabilities, multicasting capabilities, different hosts, different communication speed and bandwidth, different architectures, different message control mechanisms, different energy consumption mechanisms, different processing and memory resources, different data distribution service protocols, different message queuing protocols, different communication interfaces (e.g., physical interfaces), and other such differentiated components.

Figure 4C:
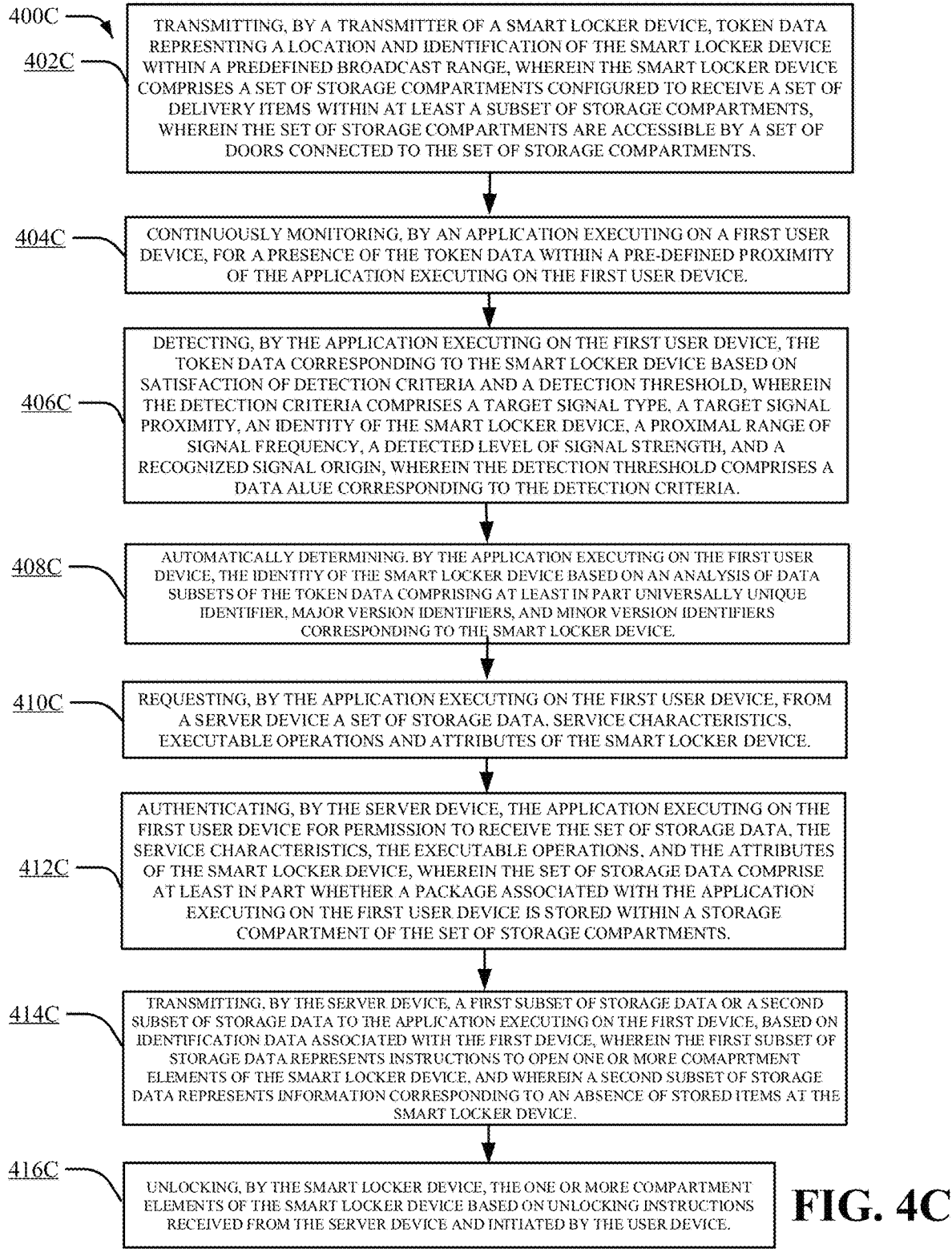
FIG. 4C illustrates a flow diagram of an example, non-limiting computer-implemented method that can facilitate an opening of a compartment element of a second device from a first device in accordance with one or more embodiments described herein.

Turning now to FIG. 4C, illustrated is a flow diagram of an example, non-limiting computer-implemented method that can facilitate an opening of a compartment element of a second device from a first device in accordance with one or more embodiments described herein. Repetitive description of like elements employed in other embodiments described herein is omitted for sake of brevity.

In an aspect, one or more of the components described in computer-implemented method 400C can be electrically and/or communicatively coupled to one or more devices. Repetitive description of like elements employed in other embodiments described herein is omitted for sake of brevity. At reference numeral 402C, a transmitter of a smart locker device can transmit token data representing a location and identification of the smart locker device within a predefined broadcast range, wherein the smart locker device comprises a set of storage compartments configured to receive a set of delivery items within at least a subset of storage compartments, wherein the set of storage compartments are accessible by a set of doors connected to the set of storage compartments. At reference numeral 404C, an application executing on a first user device can continuously monitor for a presence of the token data within a pre-defined proximity of the application executing on the first user device. At reference numeral 406C, the application executing on the first user device can detect the token data corresponding to the smart locker device based on satisfaction of detection criteria and a detection threshold, wherein the detection criteria comprises a target signal type, a target signal proximity, an identity of the smart locker device, a proximal range of signal frequency, a detected level of signal strength, and a recognized signal origin, wherein the detection threshold comprises a data value corresponding to the detection criteria.

At reference numeral 408C, the application executing on the first user device can automatically determine the identity of the smart locker device based on an analysis of data subsets of the token data comprising at least in part universally unique identifier, major version identifiers, and minor version identifiers corresponding to the smart locker device. At reference numeral 410C, the application executing on the first user device can request from a server device a set of storage data, service characteristics, executable operations and attributes of the smart locker device. At reference numeral 412C, the server device can authenticate the application executing on the first user device for permission to receive the set of storage data, the service characteristics, the executable operations, and the attributes of the smart locker device, wherein the set of storage data comprise at least in part whether a package associated with the application executing on the first user device is stored within a storage compartment of the set of storage compartments.

At reference numeral 414C, the server device can transmit a first subset of storage data or a second subset of storage data to the application executing on the first device, based on identification data associated with the first device, wherein the first subset of storage data represents instructions to open one or more compartment elements of the smart locker device, and wherein a second subset of storage data represents information corresponding to an absence of stored items at the smart locker device. At reference numeral 416C the smart locker device can unlock the one or more compartment elements of the smart locker device based on unlocking instructions received from the server device and initiated by the user device.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art can understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because second device 126 performs physical operations (e.g., unlocking, door opening, locking, etc.) based on deployment of system components described herein, the systems and hardware described herein are tangible and integrated with physical infrastructure components of second device 126 equipment. In another aspect, data, activities, and operations transmitted and performed by systems and methods described herein can be performed utilizing iterative machine learning and artificial intelligence techniques that facilitate physical operations performed by first device 122 and second device 126 where such operations are performed by components executed by a processor (e.g., processor 112) established from a combination of electrical and mechanical components and circuitry, a human is unable to replicate or perform the subject data packet configuration and/or the subject communication between processing components, a transmission component, a first unlocking component and/or a second unlocking component. Furthermore, the authentication and verification techniques based on unique signatures within the data and use of computer-implemented operations to recognize digital patterns within computer generated data representations to iteratively organize data within the system environment create storage and processing efficiencies to the hardware. Furthermore, the generation of digital data can be based on pattern recognition algorithms and data similarity algorithms as well as storage and retrieval of digitally generated data to and from a memory (e.g., using memory 108) in accordance with computer generated access patterns cannot be replicated by a human.

Also, the systems and methods disclosed herein can be integrated with the tangible and physical locker infrastructure components of one or more electronic locker equipment devices (e.g., smart box) at one or more localities. In another aspect the systems and methods disclosed can be integrated with physical devices such as tablets, desktop computers, mobile devices, and other such hardware. Furthermore, the ability to employ iterative machine learning techniques to categorize equipment data, transactional data, equipment failure data, etc. associated with several electronic locker device technologies simultaneously cannot be performed by a human. For example, a human is unable to unlock several hundreds or thousands of locker device compartments simultaneously based on system techniques, machine learning and/or artificial intelligence comparative techniques in an efficient and accurate manner. Furthermore, a human is unable to simultaneously access and employ equipment historical trend data, artificial intelligence generated equipment performance data and/or packetized data for communication between a main processor (e.g., using processor 112) and a memory (e.g., memory 108) to simultaneously facilitate the conducting of activities (e.g., unlocking, locking, access, package storage, etc.) associated with thousands of electronic locker technologies simultaneously.

Figure 5:
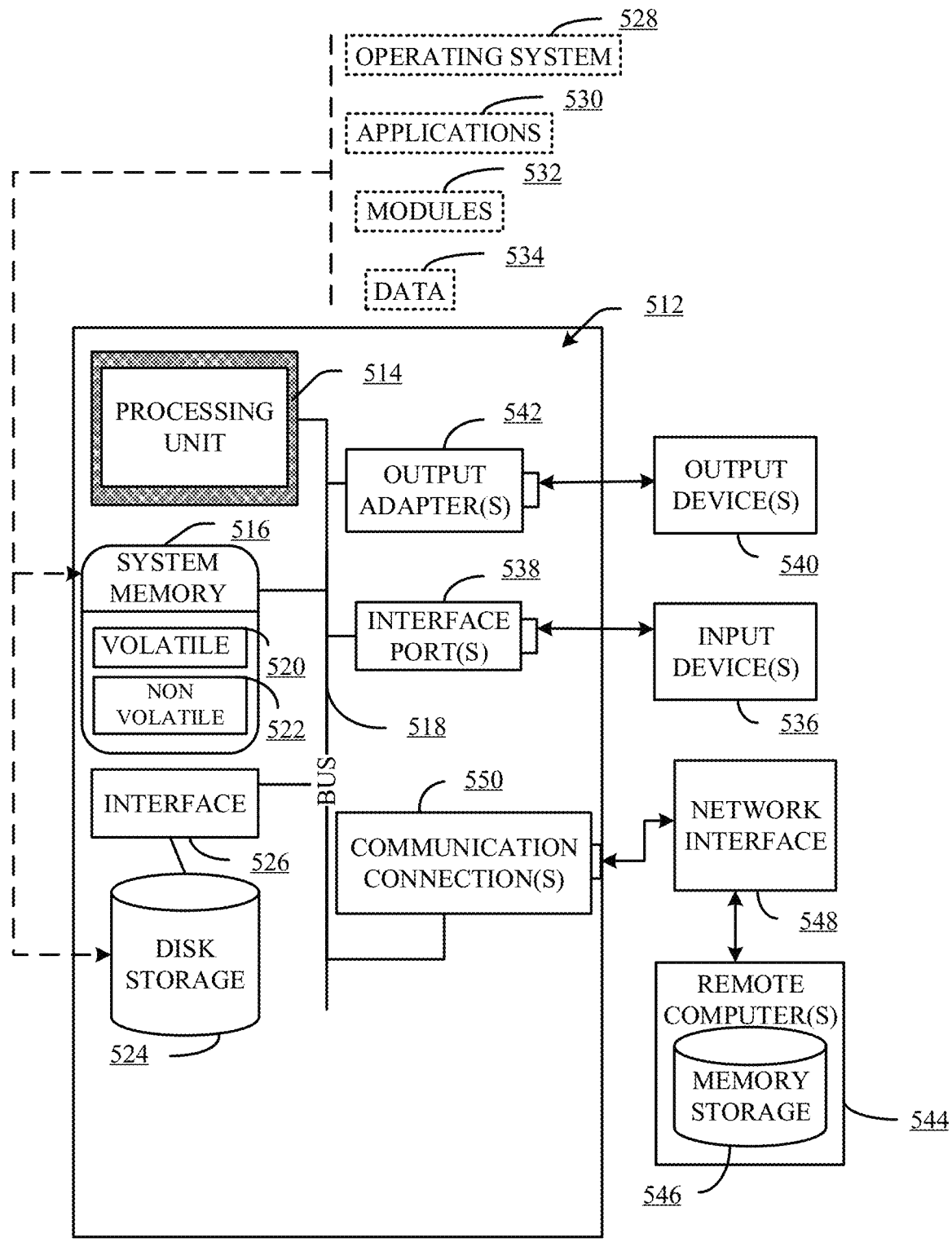
FIG. 5 illustrates a block diagram of an example, non-limiting operating environment in which one or more embodiments described herein can be facilitated.

In order to provide a context for the various aspects of the disclosed subject matter, FIG. 5 as well as the following discussion is intended to provide a general description of a suitable environment in which the various aspects of the disclosed subject matter can be implemented. FIG. 5 illustrates a block diagram of an example, non-limiting operating environment in which one or more embodiments described herein can be facilitated. With reference to FIG. 5, a suitable operating environment 500 for implementing various aspects of this disclosure can also include a computer 512. The computer 512 can also include a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514. The system bus 518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 516 can also include volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 512 can also include removable/non-removable, volatile/non-volatile computer storage media. FIG. 5 illustrates, for example, a disk storage 524. Disk storage 524 can also include, but is not limited to, devices like a magnetic disk drive, floppy disk drive, tape drive, Jaz drive, Zip drive, LS-100 drive, flash memory card, or memory stick. The disk storage 524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 524 to the system bus 518, a removable or non-removable interface is typically used, such as interface 526. FIG. 5 also depicts software that acts as an intermediary between users and the basic computer resources described in the suitable operating environment 500. Such software can also include, for example, an operating system 528. Operating system 528, which can be stored on disk storage 524, acts to control and allocate resources of the computer 512.

System applications 530 take advantage of the management of resources by operating system 528 through program modules 532 and program data 534, e.g., stored either in system memory 516 or on disk storage 524. It is to be appreciated that this disclosure can be implemented with various operating systems or combinations of operating systems. A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port can be used to provide input to computer 512, and to output information from computer 512 to an output device 540.

Output adapter 1242 is provided to illustrate that there are some output device 540 like monitors, speakers, and printers, among other such output device 540, which require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a computer, a server, a router, a network PC, a workstation, a microprocessor based appliance, a peer device or other common network node and the like, and typically can also include many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 550 refers to the hardware/software employed to connect the network interface 548 to the system bus 518. While communication connection 550 is shown for illustrative clarity inside computer 512, it can also be external to computer 512. The hardware/software for connection to the network interface 548 can also include, for exemplary purposes only, internal and external technologies such as, modems including regular telephone grade modems, cable modems and DSL modems, ISDN adapters, and Ethernet cards.

Figure 6:
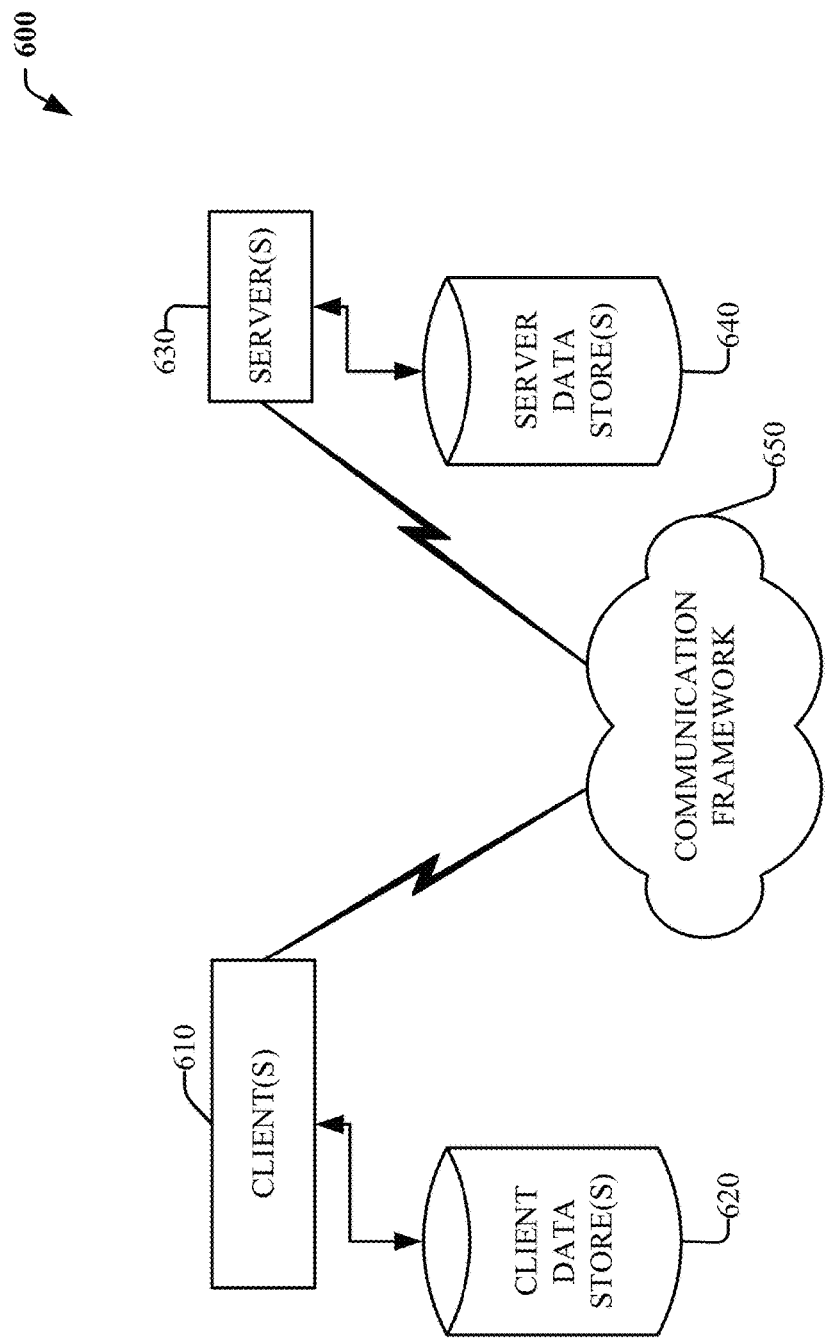
FIG. 6 illustrates a block diagram of an example, non-limiting

Referring now to FIG. 6, there is illustrated a schematic block diagram of a computing environment 600 in accordance with this disclosure. The system 600 includes one or more client(s) 602 (e.g., laptops, smart phones, PDAs, media players, computers, portable electronic devices, tablets, and the like). The client(s) 602 can be hardware and/or software (e.g., threads, processes, computing devices). The system 600 also includes one or more server(s) 604. The server(s) 604 can also be hardware or hardware in combination with software (e.g., threads, processes, computing devices). The servers 604 can house threads to perform transformations by employing aspects of this disclosure, for example. One possible communication between a client 602 and a server 604 can be in the form of a data packet transmitted between two or more computer processes wherein the data packet may include video data. The data packet can include a metadata, e.g., associated contextual information, for example. The system 600 includes a communication framework 606 (e.g., a global communication network such as the Internet, or mobile network(s)) that can be employed to facilitate communications between the client(s) 602 and the server(s) 604.

Communications can be facilitated via a wired (including optical fiber) and/or wireless technology. The client(s) 602 include or are operatively connected to one or more client data store(s) 608 that can be employed to store information local to the client(s) 602 (e.g., associated contextual information). Similarly, the server(s) 604 are operatively include or are operatively connected to one or more server data store(s) 610 that can be employed to store information local to the servers 604. In one embodiment, a client 602 can transfer an encoded file, in accordance with the disclosed subject matter, to server 604. Server 604 can store the file, decode the file, or transmit the file to another client 602. It is to be appreciated, that a client 602 can also transfer uncompressed file to a server 604 and server 604 can compress the file in accordance with the disclosed subject matter. Likewise, server 604 can encode video information and transmit the information via communication framework 606 to one or more clients 602.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
one or more processors; and
one or more storage devices comprising processor executable instructions that, responsive to execution by the one or more processors, cause the system to perform operations comprising:
concurrently controlling, by a virtualization layer of a locker delivery operating system, a set of smart locker devices employing one or more different communication interface;
transmitting, by a set of transmitters of the set of smart locker devices, token data representing a location and identification of the set of smart locker devices within a predefined broadcast range, wherein the set of smart locker devices comprise a set of storage compartments configured to receive a set of delivery items within at least a subset of storage compartments, wherein the set of storage compartments are accessible by a set of doors connected to the set of storage compartments;
continuously monitoring, by an application executing on a set of first user devices, for a presence of the token data within a pre-defined proximity of the application executing on the set of first user devices;
detecting, by the application executing on the set of first user devices, the token data corresponding to the set of smart locker device based on satisfaction of detection criteria and a detection threshold, wherein the detection criteria comprises a target signal type, a target signal proximity, an identity of the smart locker device, a proximal range of signal frequency, a detected level of signal strength, and a recognized signal origin, wherein the detection threshold comprises a data value corresponding to the detection criteria;
automatically determining, by the application executing on the set of first user devices, the identity of the set of smart locker devices based on an analysis of data subsets of the token data comprising at least in part universally unique identifier, major version identifiers, and minor version identifiers corresponding to the set of smart locker device;

requesting, by the application executing on the set of first user devices, from a server device a set of storage data, service characteristics, executable operations and attributes of the set of smart locker devices;

authenticating, by the server device, the application executing on the set of first user devices for permission to receive the set of storage data, the service characteristics, the executable operations, and the attributes of the set of smart locker devices, wherein the set of storage data comprise at least in part whether a package associated with the application executing on the set of first user devices is stored within a storage compartment of the set of storage compartments;

transmitting, by the server device, a first subset of storage data or a second subset of storage data to the application executing on the first device, based on identification data associated with the first device, wherein the first subset of storage data represents instructions to open one or more compartment elements of the smart locker device, and wherein a second subset of storage data represents information corresponding to an absence of stored items at the set of smart locker devices; and unlocking, by the set of smart locker devices, the one or more compartment elements of the set of smart locker devices based on unlocking instructions received from the server device and initiated by the user device.

2. The system of claim 1, further comprising authorizing, by a third device, the first device to retrieve the first subset of storage data based on a comparison of the identification data to a set of valid identification data.

3. The system of claim 2, further comprising transmitting, by the application executing on the first device, unlocking data representing instructions to unlock the one more compartment elements of a second device to the third device based on a validated authorization determined by the third device.

4. The system of claim 1, further comprising transmitting confirmation data from a second device to a third device, wherein the confirmation data represents the opening of the one or more compartment elements of the second device.

5. The system of claim 1, further comprising transmitting state data from a second device to a third device, wherein the state data represents at least one of a locked state, an unlocked state, a re-locked state, a storage state, or an empty state of the one or more compartment elements.

6. The system of claim 5, further comprising transmitting the state data from the third device to the application executing on the first device.

7. The system of claim 1, further comprising, storing transactions corresponding to the token data on a distributed blockchain ledger, wherein the token data is a radio signal emitted from a BLE token of a second device.

8. The system of claim 3, further comprising simultaneously opening one or more subset of compartment elements of the set of compartment elements based on subsets of identification data corresponding to more than one user devices, wherein the subsets of identification data are unique to a user device of the sets of user devices, wherein the simultaneously opening one or more subset of compartment elements by the more than one user devices generates processing efficiencies by the one or more processors as compared to consecutive processing of unlocking instructions of the more than one user devices using a user interface of the set of smart locker devices.

9. A computer-implemented method, comprising:

concurrently controlling, by a virtualization layer of a locker delivery operating system comprising at least one processor, a set of smart locker devices employing one or more different communication interface;

continuously monitoring and controlling, by a system executing on a set of first devices, for a presence of token data within a pre-defined proximity of the set of first devices;

detecting, by the system executing on the set of first devices, the token data corresponding to a transmitter of a set of smart locker devices within a predefined broadcast range, wherein the set of smart locker devices comprises a set of storage compartments configured to receive a set of delivery items within at least a subset of storage compartments, wherein the set of storage compartments are accessible by a set of doors connected to the set of storage compartments, wherein the detecting is based on satisfaction of detection criteria and a detection threshold, wherein the detection criteria comprises a target signal type, a target signal proximity, an identity of the set of smart locker devices, a proximal range of signal frequency, a detected level of signal strength, and a recognized signal origin, wherein the detection threshold comprises a data value corresponding to the detection criteria;

automatically determining, by the system executing on the set of first devices, the identity of the set of smart locker devices based on an analysis of data subsets of the token data comprising at least in part universally unique identifier, major version identifiers, and minor version identifiers corresponding to the set of smart locker devices;

requesting, by the system executing on the set of first devices, from a third device a set of storage data, service characteristics, executable operations and attributes corresponding to the set of smart locker devices;

authenticating, by the system executing on the set of first devices, the set of first user devices for permission to receive the set of storage data, the service characteristics, the executable operations, and the attributes of the set of smart locker devices, wherein the set of storage data comprise at least in part whether a package associated with the application executing on the set of first devices is stored within a storage compartment of the set of storage compartments;

transmitting, by the system executing on the third device, a first subset of storage data or a second subset of storage data to the application executing on the set of first devices, based on identification data associated with the set of first devices, wherein the first subset of storage data represents instructions to open one or more compartment elements of the set of smart locker devices, and wherein the second subset of storage data represents information corresponding to an absence of stored items at the set of smart locker devices; and unlocking, by the system executing on the set of smart locker devices, a subset of the one or more compartment elements of the set of smart locker devices based on the first subset of storage data and the detecting of the token data.

10. The method of claim 9, further comprising authorizing, by the system executing on the third device, the set of first devices to retrieve the first subset of storage data based on a comparison of the identification data to a set of valid identification data.

11. The method of claim 10, further comprising transmitting, by the system executing on the set of first devices, unlocking data representing instructions to unlock the one or more compartment elements of the set of smart locker devices, to the third device based on the comparison of the identification data to the set of valid identification data.

12. The method of claim 9, further comprising transmitting, by the system, confirmation data from the set of smart locker devices to the third device, wherein the confirmation data represents the opening of the one or more compartment elements of the set of smart locker devices.

13. The method of claim 9, further comprising transmitting, by the system, state data from the set of smart locker devices to the third device, wherein the state data represents at least one of a locked state, an unlocked state, a re-locked state, a storage state, or an empty state of the one or more compartment elements.

14. The method of claim 13, further comprising transmitting, by the system, the state data from the third device to the system executing on the set of first devices.

15. The method of claim 11, further comprising unlocking, by the system, the one or more compartment elements based on receipt of the unlocking data.

\* \* \* \* \*